United States Patent
Hiroi et al.

(10) Patent No.: US 9,391,815 B2
(45) Date of Patent: Jul. 12, 2016

(54) TRANSMISSION LINE ADDRESS OVERLAP DETECTION SYSTEM AND SUBSTATION TERMINAL USED IN THE SYSTEM

(75) Inventors: Shigeru Hiroi, Chiyoda-ku (JP); Mitsuhiro Tsunoo, Nagaokakyo (JP); Kenji Nishikido, Nagaokakyo (JP); Youichi Hoshi, Nagaokakyo (JP); Kazuo Itani, Nagaokakyo (JP); Hidemi Yamazaki, Nagakakyo (JP)

(73) Assignees: Mitsubishi Electric Corporation, Tokyo (JP); ANYWIRE CORPORATION, Nagaokakyo-shi (JP)

( * ) Notice: Subject to any disclaimer, the term of this patent is extended or adjusted under 35 U.S.C. 154(b) by 221 days.

(21) Appl. No.: 13/885,936

(22) PCT Filed: Apr. 27, 2012

(86) PCT No.: PCT/JP2012/061363
§ 371 (c)(1),
(2), (4) Date: May 16, 2013

(87) PCT Pub. No.: WO2013/161055
PCT Pub. Date: Oct. 31, 2013

(65) Prior Publication Data
US 2014/0219383 A1    Aug. 7, 2014

(51) Int. Cl.
H04L 25/02    (2006.01)
H04J 3/24    (2006.01)
(Continued)

(52) U.S. Cl.
CPC .......... *H04L 25/0264* (2013.01); *G08C 25/00* (2013.01); *H04J 3/24* (2013.01); *H04Q 9/04* (2013.01); *H04L 7/0008* (2013.01)

(58) Field of Classification Search
CPC ..... H04J 3/24; H04L 25/0264; H04L 7/0008; H04Q 9/04; G08C 25/00

USPC .......... 340/12.32, 13.24, 13.31, 426.13, 438, 340/447, 450, 457.1, 506
See application file for complete search history.

(56) References Cited

U.S. PATENT DOCUMENTS

| 5,509,029 A * | 4/1996 | Furuta ........................... 375/228 |
| 5,838,249 A | 11/1998 | Saito et al. |
| 2003/0093542 A1* | 5/2003 | Saito et al. ..................... 709/230 |
| 2003/0123590 A1* | 7/2003 | Saitou et al. .................. 375/354 |

FOREIGN PATENT DOCUMENTS

| JP | 62-173830 A | 7/1987 |
| JP | 03-106143 A | 5/1991 |

(Continued)

OTHER PUBLICATIONS

Communication dated Sep. 25, 2014 Taiwanese Intellectual Property Office in counterpart Taiwanese Patent Application No. 101136312.

(Continued)

*Primary Examiner* — Jennifer Mehmood
*Assistant Examiner* — Yong Hang Jiang
(74) *Attorney, Agent, or Firm* — Sughrue Mion, PLLC

(57) ABSTRACT

A management data area including a plurality of pulsed signals is provided in a series of pulsed signals outputted from the main station to the common data signal line, the area being different from a control/monitoring data area including data of a control data signal and data of a monitoring data signal. The substation sets random number data generated by its own station as an original number, generates pieces of comparison/collation data having a plurality of bits based on the original number, and superimposes a signal including the pieces of comparison/collation data on the management data area. The main station determines existence of address overlap of the substations based on a result of comparing the pieces of comparison/collation data complying with a predetermined rule.

7 Claims, 6 Drawing Sheets

(51) Int. Cl.
*G08C 25/00* (2006.01)
*H04Q 9/04* (2006.01)
*H04L 7/00* (2006.01)

(56) References Cited

FOREIGN PATENT DOCUMENTS

| JP | 04-119035 A | 4/1992 |
| JP | 07-099503 A | 4/1995 |
| JP | 09-084155 A | 3/1997 |
| JP | 2011-114449 A | 6/2011 |

OTHER PUBLICATIONS

Communication dated Nov. 4, 2015, issued by the State Intellectual Property Office of the P.R.C. in corresponding Chinese Application No. 201280003714.7.

* cited by examiner (a)

| TABLE NUMBER | 0 | 1 | 2 | | n |
|---|---|---|---|---|---|
| OVERLAP ADDRESS DATA | #ad2 | | | | |

(b)

(c)

| TABLE NUMBER | 0 | 1 | 2 | | n |
|---|---|---|---|---|---|
| HEAD ADDRESS DATA | #ad0 | #ad1 | #ad3 | | #adm |
| ADDRESS WIDTH DATA | 1 | 2 | 1 | | w |

TRANSMISSION LINE ADDRESS OVERLAP DETECTION SYSTEM AND SUBSTATION TERMINAL USED IN THE SYSTEM

CROSS REFERENCE TO RELATED APPLICATIONS

This application is a National Stage of International Application No. PCT/JP2012/061363, filed on Apr. 27, 2012, the contents of all of which are incorporated herein by reference in their entirety.

FIELD

The present invention relates to a transmission line address overlap detection system for detecting disconnection of a transmission line and a substation terminal used in the system in a control/monitoring-signal transmission system employing a transmission synchronization method in which a master station connected to a single control unit and a plurality of substations corresponding to a plurality of controlled devices are connected with a common data signal line for saving the number of signal lines therebetween, and data transmission is performed over the common data signal line in synchronization with a transmission clock.

BACKGROUND

In a control system including a single control unit and a plurality of controlled devices (each including a controlled part that is operable in response to a command from the control unit and a sensor unit that transmits information to the control unit), reduction of the number of lines, that is, so-called "line reduction" has widely been performed. As a general method of achieving the line reduction, a method has widely been adopted, in which, instead of parallel connection for directly connecting each of signal lines extending from the controlled devices to the control unit, a main station and a plurality of substations are both provided with a converting function of a parallel signal and a serial signal, and connected to the control unit and the controlled devices, respectively, so that transmission and reception of data is performed by the serial signal between a main station and the substations.

When the line reduction is achieved, in a state where many substations are subjected to connection, if the control unit side can not identify a location where disconnection has occurred, there are needs of checking each of the lines of the substations located far away from the control unit, and a considerable amount of man-hours is required to identify the disconnected location.

To deal with this problem, there has been proposed a method in which disconnection on the substation side is checked in the control unit side. For example, a method of detecting disconnection in a time-division-multiplexing transmission system has been disclosed in Japanese Patent Application Laid-open No. S62-173830, in which a plurality of terminal units assigned with respective addresses is connected to a single master unit via a common signal line, a transmission signal is sent to the terminal units from the master unit while sequentially changing a designated address in a cyclic manner, and a reply signal is sent to the master unit from the addressed terminal unit. In this method of detecting disconnection, it is determined that there is disconnection on the signal line when the master unit detects a state in which the reply signal can not be received from the terminal unit occurring continuously for a period of the predetermined number of transmission cycles.

In this method of detecting disconnection, a command system is employed as a system of performing transmission and reception of data between the devices, in which a counterpart (substation) for performing the transmission and reception of data is designated by data (address data) for identifying the counterpart. Even in the method of performing the transmission and reception of data by the serial signal in the case of line reduction, it is possible to employ this command system. However, in the command system, the transmission efficiency is degraded if the command data (address data) is significant relative to the amount of data to be transmitted. Then, in order to increase the transmission efficiency with the serial signal, a transmission synchronization system may be preferred in which the transmission and reception of data is performed using a monitoring signal and a control signal that are sequentially transmitted in a pulse cycle that is not involved in the address data. In this manner, the command system and the transmission synchronization system are used differently depending on the usage in the line reduction technique, and even in a system employing the transmission synchronization system, there has been proposed a method in which a control unit side checks line disconnection of the substation side.

For example, in Japanese Patent Application Laid-open No. H7-99503, a data transmission apparatus has been disclosed, which can easily identify a location where an abnormality has occurred in a transmission line. In this data transmission apparatus, an answer unit is provided in each terminal unit, wherein the answer unit outputs a confirmation signal in the last area of one round of a pulse signal transmitted on a signal line under a condition that a count value of a round counter of its own station reaches a predetermined value assigned to the station. Then, an abnormality detection unit connected to the signal line determines the presence or absence of the confirmation signal from the answer unit of the terminal unit corresponding to the count value of its own round counter. It is then determined that there is no connection abnormality in the terminal unit corresponding to the count value when there is the confirmation signal, and a check signal is outputted to the last area of one round of the pulse signal to be transmitted on the signal line. On the other hand, when there is no confirmation signal, it is determined that there is a connection abnormality in the terminal unit corresponding to the count value, and no check signal is outputted, by which the master unit can detect disconnection of line.

Furthermore, Japanese Patent Application Laid-open No. H9-84155 discloses a technique in which, in a control and monitoring system that includes a single master station and at least one slave station connected to the master station in a branched manner, and performs control with transmitting a control signal sent from the master station to the sub-station while transmitting a monitoring signal including a state of the slave station to the master station, the master station that is situated at the center can detect a location where an abnormality has occurred, line disconnection is detected even if a transmission cable is branched, and states of a controlled part, a sensor unit, and the like are identified at the center. In the system disclosed in this literature, a frame sent from the master station is composed of a start signal having a long period of a power-source voltage level, a data signal, and signal and end signal of an identification code (ID code) of a slave station, and an end signal, and a frame with a sequentially changed ID code is sent out in a sequential manner. In each slave station, an ID code assigned to its own station and a count value indicating a data transmission and reception address are set, and an end response is generated at a timing of the end signal when the former ID matches the ID code received from the master station. In the master station, the end response from the corresponding slave station is stored, thus storing a configuration of the slave stations.

CITATION LIST

Patent Literatures

Patent Literature 1: Japanese Patent Application Laid-open No. S62-173830
Patent Literature 2: Japanese Patent Application Laid-open No. H7-99503
Patent Literature 3: Japanese Patent Application Laid-open No. H9-84155

SUMMARY

Technical Problem

However, in the conventional system for detecting disconnection in the line reduction system, it has not been possible to confirm whether a response indicating disconnection is a true response from a substation to be checked. Furthermore, a unique address is set to each of a plurality of substations, but if the address of its own station is overlapped with an address of other substations due to an artificial incorrect setting, transmitted data compete against each other between the substations of the overlapped addresses, resulting in collapse of correct delivery of data.

In view of the above problems, an object of the present invention is to provide a transmission line address overlap detection system and a substation terminal used in the system, which in a control/monitoring-signal transmission system employing a transmission synchronization system in which data transmission is performed via a common data signal line with a main station connected to a single control unit and a plurality of substations corresponding to a plurality of controlled devices being synchronized with each other by a transmission clock, can accurately detect an address setting state of the substation and disconnection between a transmission line and each substation and additionally detects the address overlap of the sub stations.

Solution to Problem

In a control/monitoring-signal transmission system employing a transmission line address overlap detection system according to the present invention, a single main station and a plurality of substations are connected to each other with a common data signal line. Under control of a transmission clock generated by a timing generation unit included in the main station, the main station outputs a series of pulsed signals to the common data signal line as a control data signal in accordance with a value of control data received from a control unit, extracts a data value of a monitoring data signal superimposed on the series of pulsed signals for each cycle of the clock from each of the substations, and sends the extracted data value to the control unit. Each of the substations counts pulses of the series of pulsed signals starting from a start signal indicating start of the series of pulsed signals, extracts the control data corresponding to its own substation from the series of pulsed signals when the count value matches an address of its own substation, and superimposes the monitoring data signal on the series of pulsed signals at the same pulse cycle as a clock at which the control data corresponding to its own substation are extracted. In the transmission line address overlap detection system according to the present invention, a management data area including a plurality of pulsed signals, which is different from a control/monitoring data area including data of the control data signal and data of the monitoring data signal, is provided in the series of pulsed signals, the substation sets random number data generated by its own substation as an original number, generates a plurality of pieces of comparison/collation data including data having a plurality of bits based on the original number, and superimposes a signal including the pieces of comparison/collation data on the management data area, and the main station determines existence or non-existence of address overlap of the substations based on a result of comparing the pieces of comparison/collation data in compliance with a predetermined rule.

When overlap of the address of the substation is detected, the main station creates an overlap address table in which the overlap address is stored, and while the overlap address is stored in the overlap address table, the main station determines that there is an abnormal state and performs an address adjustment to resolve the overlap of the address, and when no overlap address is stored in the overlap address table, the main station determines that there is a normal state.

The management data area may include a management control data area on which data from the main station are superimposed and a management monitoring data area on which data from the substation are superimposed, the data to be superimposed on the management monitoring data area from the substation may be set to data having a value other than "0", and when data extracted from the management monitoring data area in the main station has a value of "0", it may be determined that there is disconnection of the common data signal line.

The main station may count a head address and a non-head address of a substation, and specify the count value as an address width data of the substation.

The main station and the substation may display a concern that overlap of an address occurs when the overlap of the address occurs.

A substation terminal according to the present invention is connected to a common data signal line connected to a main station, and includes an address extraction unit, a monitoring-data transmission unit, a management-control-data extraction unit, a management-monitoring-data transmission unit, and a comparison/collation-data output unit. The address extraction unit counts pulses of a series of pulsed signals transmitted via the common data signal line starting from a start signal indicating start of the series of pulsed signals, and obtains a control data signal at a timing when the count value matches an address of its own substation. The monitoring-data transmission unit superimposes a monitoring data signal as information from its own substation on the series of pulsed signals transmitted via the common data signal line at a timing when the control data signal is received from the address extraction unit. The management-control-data extraction unit extracts the management control data superimposed by the main station on a management data area including a plurality of pulsed signals, which is different from an area for superimposing the monitoring-data signal, in the series of pulsed signals. The management-monitoring-data transmission unit superimposes a management monitoring data signal as information from its own substation in an input data period having the same cycle corresponding to an output data period for which a signal constituting the management control data is superimposed. The comparison/collation-data output unit obtains address data from the management-control-data extraction unit, and when the address data matches an address of its own substation, sets random number data generated by its own substation as an original number, generates a plurality of pieces of comparison/collation data including data having a plurality of bits based on the original number, and sends the pieces of comparison/collation data to the management-monitoring-data transmission unit.

Advantageous Effects of Invention

According to the transmission line address overlap detection system of the present invention, in a series of pulsed signals in which one cycle of the transmission clock is separated into an input data period and an output data period, there is provided a management data area including a plurality of pulsed signals, which is different from a control/monitoring data area including data of the control data signal and data of the monitoring data signal. On this management data area, a signal constituting comparison/collation data is superimposed, the comparison/collation data being obtained by combining random number data different from each other as responses from the substations and conversion data obtained by converting the random number data in compliance with a predetermined relationship. Furthermore, in the main station, existence or non-existence of the address overlap of the substations is determined based on a result of comparing and collating the random number data and the conversion data. Therefore, as a response from the substation to be detected, the overlap of the address of the substations can be accurately detected without causing an incorrect detection due to a noise or the like.

When the overlap of the address of the substations is detected, the main station is configured to create an overlap address table in which an overlap address is stored, determine that there is an abnormal state and adjust the address to resolve the address overlap while the overlap address is stored in the overlap address table, and determine that there is a normal state when no overlap address is stored in the overlap address table. With this configuration, it is possible to manage the existence or non-existence of the overlap of the address of the substations accurately using the overlap address table.

If data to be superimposed from the substation on the management monitoring data area of the transmission clock signal has a value other than "0", it can be said that when data extracted from the management monitoring data area by the main station have "0", it is a state where information outputted from the substation is not transmitted to the main station via the common data signal line. Therefore, in such a case, it is possible to determine that there is disconnection of the common data signal line, thus also possible to detect disconnection of the common data signal line together with existence or non-existence of the overlap of the address of the substation.

The main station is configured to count a head address and a non-head address of the substation, and specify a count value as an address width data of the substation. With this configuration, it is possible to accurately specify the address width data of the substation.

The substation is configured to display occurrence of the overlap of the address when the overlap of the address occurs. With this configuration, it is possible to notify a remote operator of the occurrence of the overlap of the address.

The substation terminal according to the present invention includes the management-monitoring-data transmission unit that superimposes the management monitoring data signal as information from its own substation during the input data period having the same cycle corresponding to the output data period for which the signal constituting the management control data is superimposed, on the management data area, and the comparison/collation-data output unit that, when the address data superimposed on the management data area from the main station matches the address of its own substation, sends the comparison/collation data obtained by combining the random number data and the conversion data obtained by converting the random number data complying with a predetermined relationship therebetween to the management-monitoring-data transmission unit. Therefore, the substation terminal is preferable to the transmission line address overlap detection system according to the present invention.

The substation terminal according to the present invention further includes an overlap address display unit that displays, when the overlap of the address of the substation is notified from the control unit, an occurrence of the overlap of the address. Therefore, the substation terminal is preferable to the transmission line address overlap detection system according to the present invention.

DESCRIPTION OF EMBODIMENTS

Figure 1:
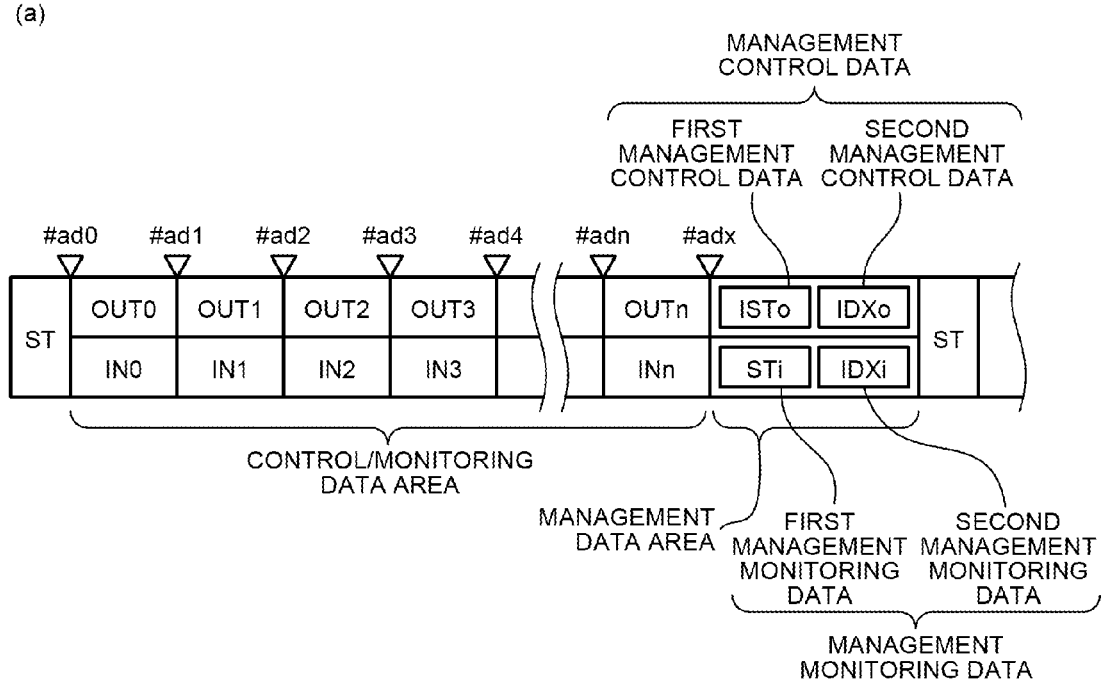
FIG. 1 has schematic diagrams of a transmission system between a main station and a substation of a control/monitoring-signal transmission system employing a transmission line disconnection detection system in an embodiment according to the present invention.
Figure 1:
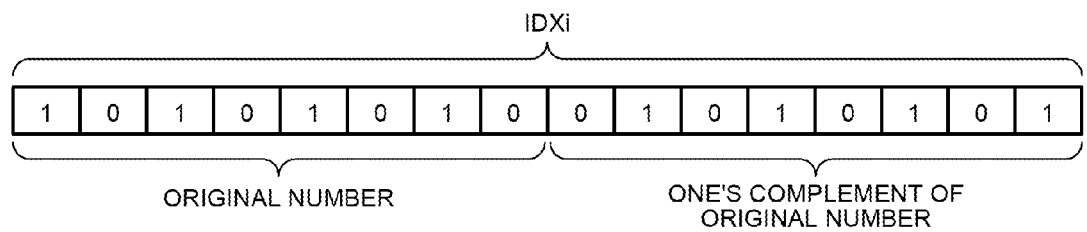
Figure 2:
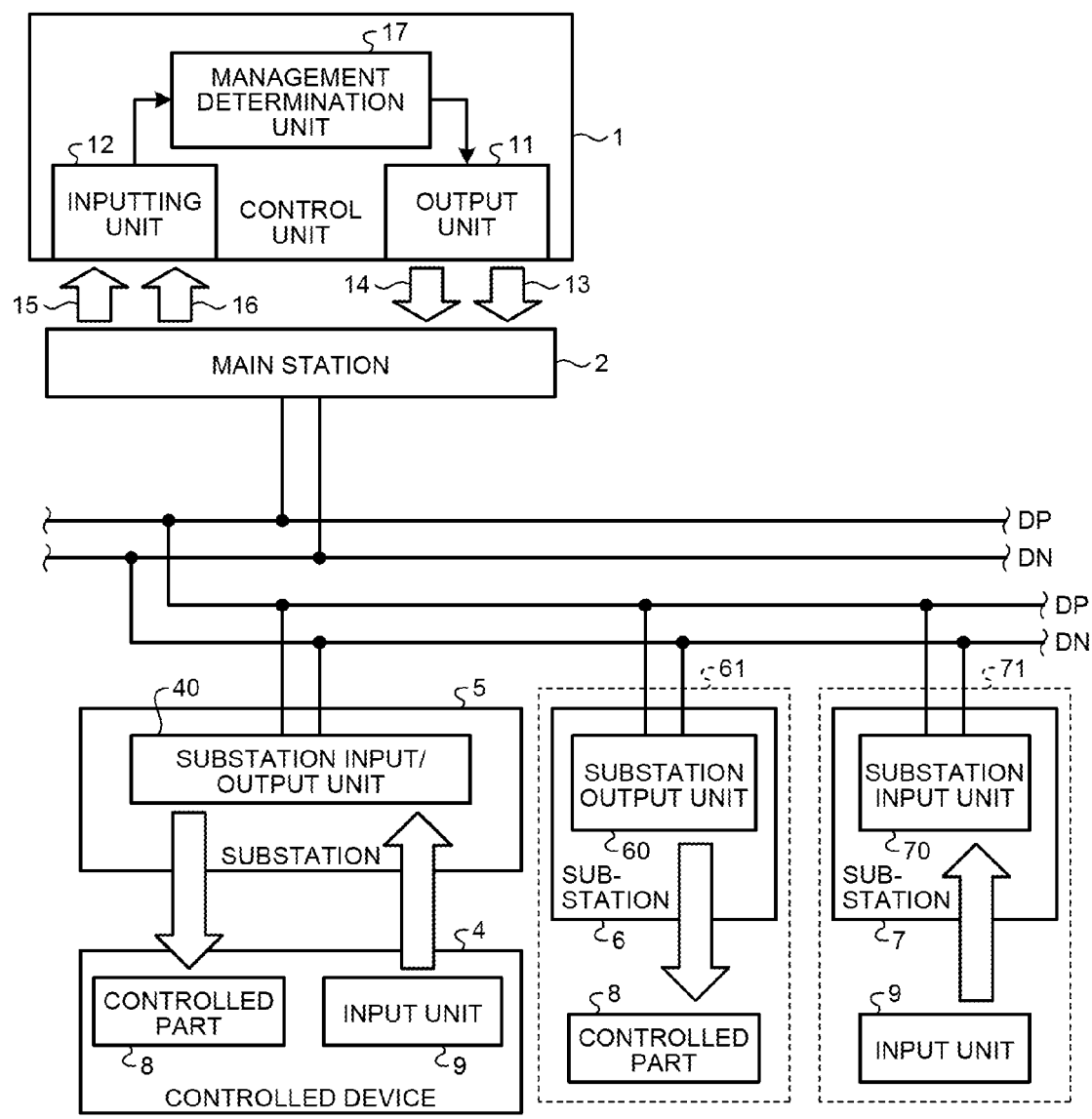
FIG. 2 is a system configuration diagram showing a schematic configuration of a control/monitoring-signal transmission system.

Embodiments of a control/monitoring-signal transmission system employing a transmission line address overlap detection system according to the present invention are described below with reference to FIGS. 1 to 6. As shown in FIG. 2, this control/monitoring-signal transmission system is comprised of: a single main station 2 connected to a control unit 1, and common data signal lines DP and DN; and a plurality of substations including an input/output substation 5, an output substation 6, and an input substation 7 that are connected to the common data signal lines DP and DN. In FIG. 2, for convenience of drawing, each substation is shown one at a time, but there is no limit on the types and the number of substations connected to the common data signal lines DP and DN.

The input/output substation 5, the output substation 6 and the input substation 7 (in the drawings, these are abbreviated as "substation 5", "substation 6" and "substation 7", respectively) perform either one or both of a signal output process for a controlled part 8 that is operated in response to an output command of the control unit 1 and a signal process of an input from an input unit 9 that takes in input information for the control unit 1. For example, the controlled part 8 is an actuator, (stepping) motor, solenoid, electromagnetic valve, relay, thyristor, lamp, or the like, and the input unit 9 is a reed switch, microswitch, push-button switch, optoelectronic switch or the like. The input/output substation 5 is connected to both the controlled part 8 and the input unit 9, the output substation 6 is connected only to the controlled part 8, and the input substation 7 is connected only to the input unit 9. The output substation 6 may include the controlled part 8, and the input substation 7 may include the input unit 9.

For example, the control unit 1 is a programmable controller, computer or the like, and includes an outputting unit 11 that outputs control data 13 and management control data 14, and an inputting unit 12 that receives monitoring data 16 that is data (sensor data) of a monitoring data signal from a side of a controlled device 4 and substation response data 15. The outputting unit 11 and the inputting unit 12 are connected to the main station 2. The control unit 1 further includes a management determination unit 17 that creates data to be outputted from the outputting unit 11 based on data received from the inputting unit 12.

Figure 3:
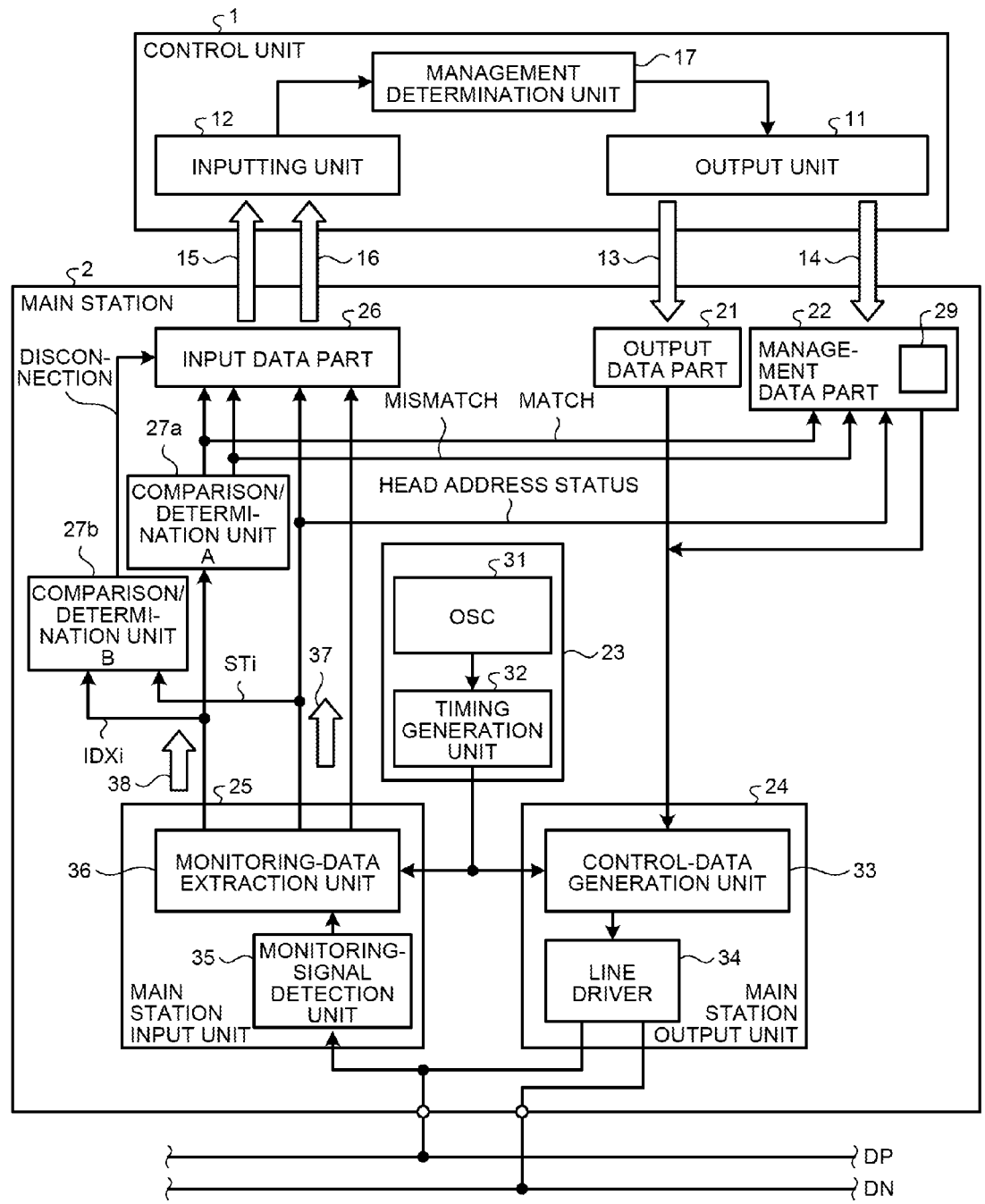
FIG. 3 is a system configuration diagram of a main station.

As shown in FIG. 3, the main station 2 includes an output data part 21, a management data part 22, a timing generation unit 23, a main-station output unit 24, a main-station input unit 25, an input data part 26, a comparison/determination unit A 27a, and a comparison/determination unit B 27b. The main station 2 is connected to the common data signal line DP, DN, outputs a control data signal that is a series of pulsed signals (hereinafter, "transmission clock signal") to the common data signal line DP and DN, and outputs comparison data obtained based on the monitoring data signal and a management monitoring data signal outputted from the input/output substation 5, the output substation 6 or the input substation 7 (hereinafter, called "substations 5, 6, 7" when referring to all the substations) to the inputting unit 12 of the control unit 1 as the monitoring data 16 and the substation response data 15.

The output data part 21 sends parallel data received from the outputting unit 11 of the control unit 1 as the control data 13 to the main-station output unit 24 as serial data.

The management data part 22 includes a storage unit 29 for storing an IDX address table in which information on each of the substations 5, 6, 7 is consolidated. In the present embodiment, the IDX address table is data for identifying any one of the substations 5, 6, 7 that is to be targets for checking disconnection, where head addresses of the substations 5, 6, 7 are used. The IDX address table is created in response to reception of a command to create a data table from the control unit 1, and a procedure of creating the table is described later.

The timing generation unit 23 includes an oscillation circuit (OSC) 31 and a timing generation unit 32, and the timing generation unit 32 generates a timing clock of this system based on the OSC 31 and sends the generated timing clock to the main-station output unit 24.

The main-station output unit 24 includes a control-data generation unit 33 and a line driver 34. The control-data generation unit 33 sends the transmission clock signal as a series of pulsed signals to the common data signal lines DP and DN via the line driver 34 based on data received from the output data part 21 and the management data part 22 and the timing clock received from the timing generation unit 23.

Figure 5:
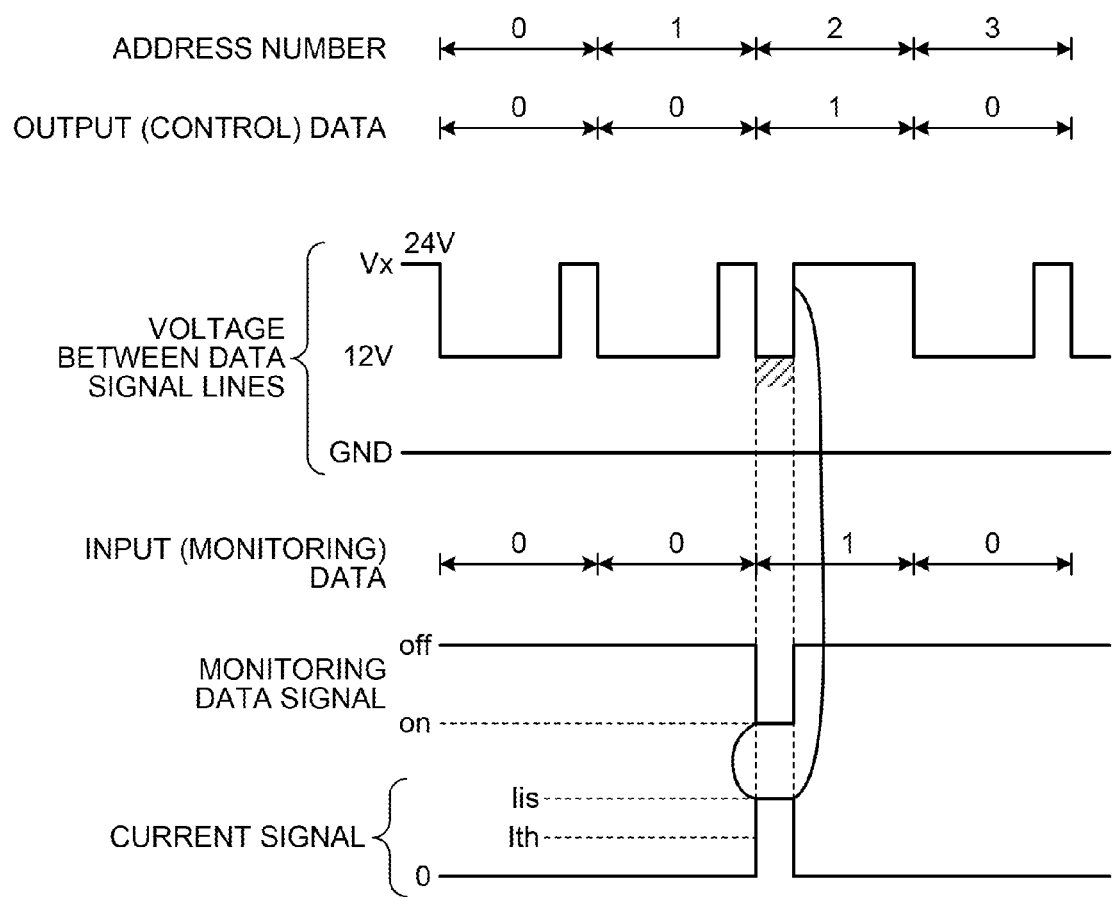
FIG. 5 is a time chart of a transmission clock signal.

As shown in FIG. 1(a), the transmission clock signal includes a control/monitoring data area following a start signal ST and a management data area following the control/monitoring data area. The control monitoring data area includes data OUTn (n is an integer) of the control data signal sent from the main station 2 and data INn (n is an integer) of the monitoring data signals sent from the substations 5, 6, 7. The transmission clock signal has, as shown in FIG. 5, a high potential level (+24 volts in the present embodiment) in a first half of one cycle and a low potential level (+12 volts in the present embodiment) in a second half of the cycle. A pulse width interval of the first half of a pulse, which has the low potential level, is used as an output data period, and the first half of a pulse, which has the low potential level, is also used as an input data period. Then, the pulse width interval of the low potential level represents the data OUTn of the control data signal, and the presence or absence of a current superimposed on the low potential level represents the data INn of the monitoring data signal. In the present embodiment, when one cycle of the transmission clock signal is t0, the pulse width interval of the low potential level ranges from ($\frac{1}{4}$)t0 to ($\frac{3}{4}$)t0; however, so long as the width is responsive to a value of each piece of data of the control data 13 inputted from the control unit 1, the width is not limited to any particular value, and can be decided as appropriate. Furthermore, the input data period and the output data period can also be decided as appropriate. For example, the input data period may be set to the first half of a pulse (the low potential level) in the same manner as the present example, and the output data period may be set to the second half of the pulse (the high potential level). Conversely, the output data period may be set to the first half of a pulse (the low potential level) in the same manner as the present example, and the input data period may be set to the second half of the pulse (the high potential level). Furthermore, the second half of a pulse (the high potential level) may be used for both the input data period and the output data period. The same is true for the case where the second half of one cycle of the transmission clock signal has the low potential level. In FIG. 1(a), the upper part represents the output data period and the lower part represents the input data period.

The management data area of the transmission clock signal includes a management control data area on which the management control signal sent from the main station 2 is superimposed and a management monitoring data area on which the management monitoring signals sent from the substations 5, 6, 7 are superimposed. The management control data transmitted in the management control signal includes first management control data ISTo and second management control data IDXo, and in the same manner as the data OUTn of the control signal, is represented as a pulse width interval of the low potential level. The management monitoring data transmitted in the management monitoring signal includes first management monitoring data STi and second management monitoring data IDXi, and in the same manner as the data INn of the monitoring signal, is represented as the presence or absence of the current superimposed on the low potential level. In the present embodiment, the first management control data ISTo and the second management control data IDXo are used as command data for identifying a type of data to be requested to the substations 5, 6, 7 or address data for identifying any one of the substations 5, 6, 7. On the other hand, the first management monitoring data STi and the second management monitoring data IDXi are used as data indicating a state of its own station, and data other than "0" are constantly transmitted as the management monitoring data. Details of this are described later.

The start signal ST has the same potential level as the high potential level of the transmission clock signal, which is a signal longer than one cycle of the transmission clock signal.

The main-station input unit 25 includes a monitoring-signal detection unit 35 and a monitoring-data extraction unit 36, and sends serial input data 37 to the input data part 26. The main-station input unit 25 further sends IDXi data 38 that are the second management monitoring data extracted by the monitoring-data extraction unit 36 to the comparison/determination unit A 27a and the comparison/determination unit B 27b, and sends STi data 39 extracted by the monitoring-data extraction unit 36 to the management data part 22, the input data unit 26, and the comparison/determination unit B 27b. The monitoring-signal detection unit 35 detects the monitoring data signal and management monitoring data signal sent from the substations 5, 6, 7 via the common data signal line DP and DN. Data values of the monitoring data signal and the management monitoring data signal are represented by the presence or absence of the current superimposed on the low potential level part, as described above, and after the start signal ST is transmitted, the monitoring data signal is sequentially received from the input/output substation 5 or the input substation 7, and then the management monitoring data signal is received from any one of the substations 5, 6, 7. The data of the monitoring data signal and the management monitoring data signal are extracted by the monitoring-data extraction unit 36 in synchronization with a signal from the timing generation unit 32. The data of the monitoring data signal are then sent to the input data part 26 as the serial input data 37.

The input data part 26 converts the serial input data 37 received from the main-station input unit 25 into parallelism (parallel) data, and sends the parallel data to the inputting unit 12 of the control unit 1 as the monitoring data 16. The input data part 26 further sends random-number match data and random-number mismatch data received from the comparison/determination unit A 27a and disconnection data received from the comparison/determination unit B 27b to the inputting unit 12 of the control unit 1 as the substation response data 15.

Figure 4:
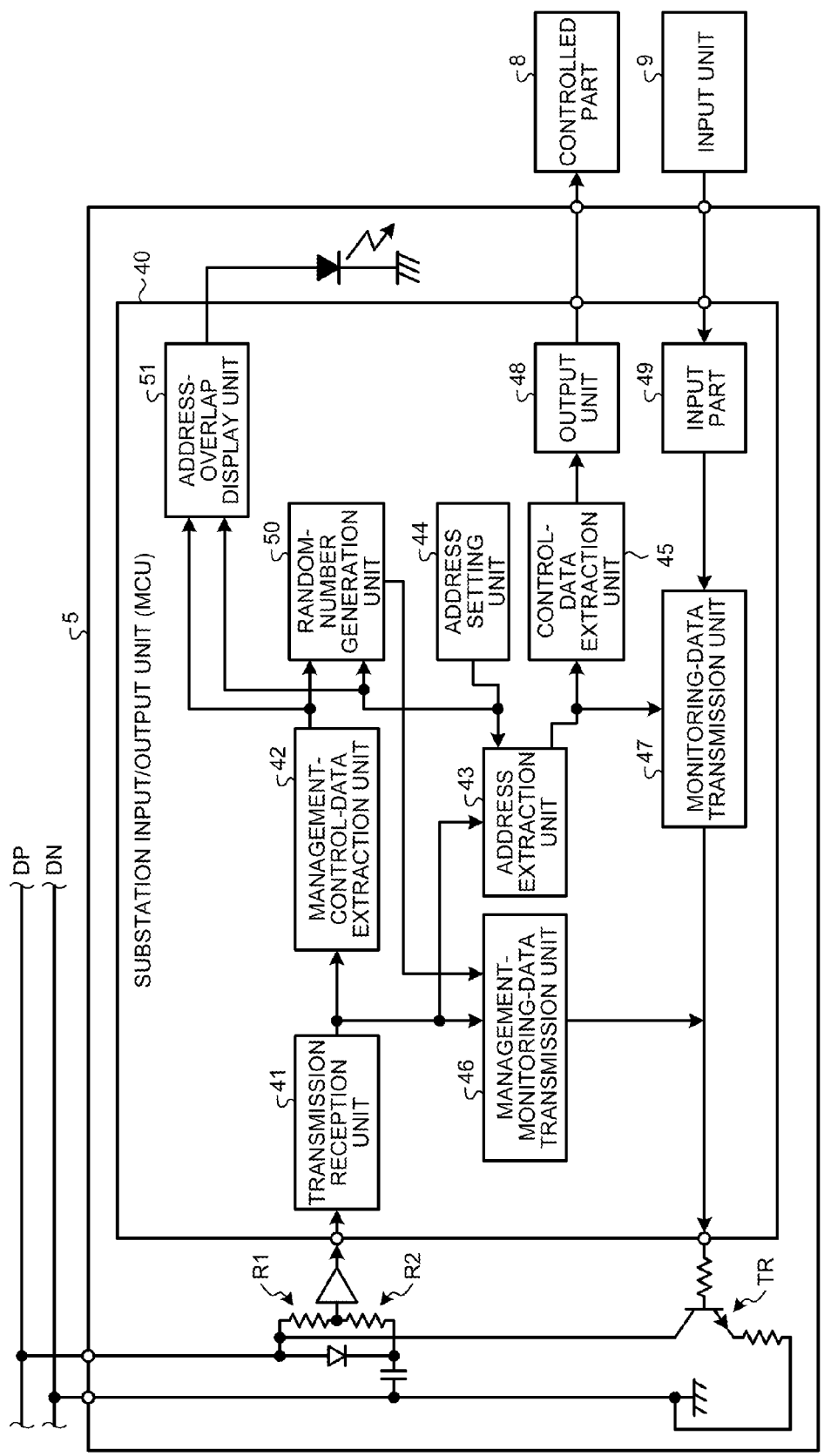
FIG. 4 is a system configuration diagram of an input/output substation.

As shown in FIG. 4, the input/output substation 5 includes a substation input/output unit 40 including a transmission reception unit 41, a management-control-data extraction unit 42, an address extraction unit 43, an address setting unit 44, a control-data extraction unit 45, a management-monitoring-data transmission unit 46, a monitoring-data transmission unit 47, an output part 48, an input part 49, a random-number generation unit 50, and an address-overlap display unit 51. The input/output substation 5 according to the present embodiment includes an MCU, that is a microcomputer controller unit, as an internal circuit, and this MCU is configured to function as the substation input/output unit 40. Calculation and storage required for processing are performed using a CPU, a RAM and a ROM included in the MCU (hereinafter, "MCU 40"). For the convenience of description, a relationship with the CPU, RAM and ROM in processing of each of the units constituting the substation input/output unit 40 is omitted from the drawings.

The transmission reception unit 41 receives the transmission clock signal transmitted through the common data signal lines DP and DN, and sends the transmission clock signal to the management-control-data extraction unit 42, the address extraction unit 43, and the management-monitoring-data transmission unit 46. The management-control-data extraction unit 42 extracts data of the management control data signal from the management data area of the transmission clock signal, and sends the extracted data to the random-number generation unit 50. On the other hand, the address extraction unit 43 counts pulses starting from the start signal ST indicating start of the transmission clock signal, and sends the control data signal to the control-data extraction unit 45 and the monitoring-data transmission unit 47 at the moment when the count value matches the address data of its own station set by the address setting unit 44.

The control-data extraction unit 45 extracts a data value from the control data signal sent from the address extraction unit 43, and sends the extracted data value to the output part 48 as serial data. The output part 48 converts the serial data sent from the control-data extraction unit 45 into parallel data, and outputs the parallel data to the controlled part 8 to cause the controlled part 8 to perform a predetermined operation.

The monitoring-data transmission unit 47 sets a base current of a transistor TR to "on" or "off" based on the serial data sent from the input part 49 in the timing in which the control data signal is sent from the address extraction unit 43. When the base current is "on", the transistor TR is switched "on", and a current signal, that is the monitoring data signal, is outputted to the data signal lines DP and DN. In the present embodiment, as shown in FIG. 5, this is represented by a situation in which a current equal to or larger than a predetermined value Ith (for example, 30 mA) to flow therein when the data value of the monitoring data signal is "1". Therefore, for example, the monitoring data at an address 0 (#ad0), an address 1 (#ad1), an address 2 (#ad2) and an address 3 (#ad3) of a signal shown in FIG. 5 represent "0", "0", "1" and "0", respectively. The data sent from the input part 49 to the monitoring-data transmission unit 47 is based on an input from the input unit 9, and for example, when an ON-OFF switch is connected as the input unit 9, they are based on a current signal or a voltage signal indicating "on" or "off" of the switch.

The management-monitoring-data transmission unit 46 counts the pluses starting from the start signal ST of the transmission clock signal, and obtains timing of the management data area. The management-monitoring-data transmission unit 46 then outputs the base current of the transistor TR based on data sent from the random-number generation unit 50 to output a current signal, that is the management monitoring data signal, to the data signal lines DP and DN.

The random-number generation unit 50 corresponds to a comparison/collation-data output unit in the present invention. When the data IDXo of the management control data signal for each frame, sent from the management-control-data extraction unit 42 matches the address of its own station and the data value for an address range included in the substation, the unit 50 causes the substation to generate random number data, sets the generated random number data to an original number, and generates a plurality of pieces of comparison/collation data consisting of data of a plurality of bits based on the original number. The random-number generation unit 50 then outputs the generated comparison/collation data as the IDXi as needed.

When the main station 2 detects overlap of an address of a substation in a method described later, the address-overlap display unit 51 issues a command to turn on a display of the address overlap for the abnormal address of the substation designated by the data IDXo of the management control data signal based on the first management control data ISTo sent from the control unit 1. The display of the address overlap of the substation is turned off by a command from the control unit 1 when the abnormal address disappears.

A substation output unit 60 of the output substation 6 has the same configuration as the substation input/output unit 40 except that it does not have the input part 49, and thus explanations thereof will be omitted. Furthermore, a substation input unit 70 of the input substation 7 has the same configuration as the substation input/output unit 40 except that it does not have the output part 48, and thus explanations thereof will be omitted.

A procedure of the transmission line address overlap detection system in the control/monitoring-signal transmission system having the configuration mentioned above is described below. In this control/monitoring-signal transmission system, at the time of system start-up, the IDX address table is created first. For the creation of the IDX address table, a command to create the IDX address table is sent from the control unit 1 to the main station 2. Upon receiving this command, the main station 2 instructs the creation of the IDX address table using the first management control data ISTo for each frame transmission cycle including the start signal ST, and the subsequent control/monitoring data area and management data area, and sequentially specifies all addresses assigned to the substations 5, 6, 7 in the transmission using the second management control data IDXo.

When the second management control data IDXo corresponds to its own station address and the address range included in the substation, each of the substations 5, 6, 7 sets the random number data to the original number at the moment when the second management monitoring data IDXi is generated in the relevant substation, generates a plurality of pieces of comparison/collation data consisting of data of a plurality of bits based on the original number, and transmits the pieces of comparison/collation data to the common data signal lines to return them to the main station 2. Furthermore, a head address status is returned as the first management monitoring data STi only in the case of the substation head address of the address of its own station. It is regulated that the pieces of comparison/collation data include two types of data including the random number data that is the original number (8 bits in the embodiment) and one's complement data of the original number (inverted 8 bits of the original number). This rule can be changed to another regulation so long as there is a predetermined rule based on the random number data. For example, the random number data can be set to the original number, and two kinds of data including one's complement data of the original number and two's complement data of the original number may be used to constitute the pieces of comparison/collation data. Furthermore, two types of data including the original number and a negative number of the original number or two types of data including the original number and two's complement of the original number may be used to constitute the pieces of comparison/collation data. Furthermore, three or more kinds of data generated by a predetermined rule based on the random number data that is the original number, for example, three kinds of data including the original number, one's complement of the original number, and two's complement of the original number may be used to constitute the pieces of comparison/collation data.

In the main station 2, the transmission data are received, the second management monitoring data IDXi are extracted therefrom, the comparison/determination unit A 27a is used to perform inverse conversion for restoring the original number from each of the pieces of comparison/collation data based on the rule mentioned above, and then the pieces of data obtained by the inverse conversion are compared and collated. In other words, when the pieces of comparison/collation data are constituted of two kinds of data including the random number data that is the original number and one's complement data of the original number, the original number is left as it is because it does not need the inverse conversion, the one's complement data of the original number is subjected to the inverse conversion by inverting each bit, and then these two kinds of data are compared and collated with each other.

In the case where the address range is overlapped between a plurality of substations, because the address specified by the management control data IDXo leads to a situation where the plural substations are addressed with their own addresses, the substations return different comparison/collation data from each other. At this time, the one and the other comparison/collation data becomes competition data for each other, and as a result, the original number and data after the inverse conversion are changed to data that is different from the original number in the way it should be.

Therefore, as a result of performing the inverse conversion of the pieces of comparison/collation data complying with the rule mentioned above and subsequently comparing and collating the conversion results, if they do not match each other, the main station 2 determines that the address range is overlapped between the plural substations. In this case, the main station 2 regards that the addresses of the substations are overlapped with each other, and stores a head overlap address of the substation in data constituting the overlap address table (FIG. 6(*a*)).

Figure 6:
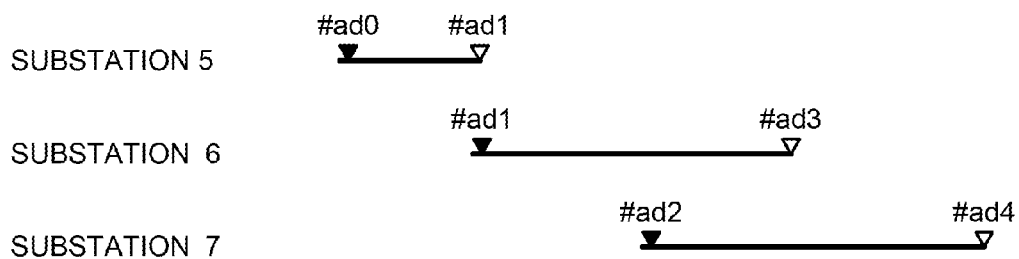
FIG. 6 has schematic diagrams of IDX address tables stored in a main station.

When there occurs an overlap address (FIG. 6(*b*)), the main station 2 notifies the relevant substation of the overlap address abnormality using the management control data IDXo in response to the head overlap address. The management control data IDXo are involved in the overlap address for the plural substations, but because one main station 2 is used for transmitting the transmission signal, competition of the transmission data never occurs. The substation receiving the overlap address abnormality displays the overlap address abnormality. In the same manner, the main station 2 notifies the control unit 1 of the address overlap abnormality. The control unit 1 receiving this designates one of a group of data pieces stored in the IDX address table shown in FIG. 6(*c*), and instructs the relevant substation to turn on the address overlap display by transmitting the second management control data IDXo to the common data signal lines for each transmission frame. With this operation, the address-overlap display unit 51 is turned on in the substation.

When there is the address overlap abnormality, the main station 2 can eliminate the address overlap by reconfiguring address setting of the substation having the address overlap abnormality. While the head overlap address of the substation is stored in the overlap address table, the main station 2 determines that there exists an abnormal state, and repeats the reconfiguration of the address setting for resolving the address overlap. When there are no more overlap address data in the overlap address table, the main station 2 determines that the address overlap is resolved and a normal state is recovered.

After performing the inverse conversion of each of the pieces of comparison/collation data complying with the rule mentioned above, if a result of comparing and collating the data shows that the data match with each other, then the main station 2 determines that there is no overlap address. In this case, a head address of a substation of an address having a head address status of the first management monitoring data STi is stored in data constituting the IDX address table of the main station 2 (FIG. 6(*c*)). Furthermore, the master station 2 sends match data and mismatch data indicating the comparison and collation result mentioned above to the control unit 1 as the substation response data 15.

After there becomes no overlap address data in the overlap address table, it is determined that the overlap of the address is resolved and a normal state is recovered, the main station 2 counts head addresses and non-head addresses, and registers the count value in an address width data IDX table as address width data. At this time, the control unit 1 transmits an address overlap display release command by the ST0 and the relevant address by the IDX0, thereby to instruct the substation to turn off the address overlap display in response to a plurality of overlap addresses for each frame transmission. With this operation, the address-overlap display unit 51 is turned off in the substation.

In the IDX address table to be created, only the head address is stored as the data of the IDX address table. In the case shown in FIG. 6(*c*), a station to which the address of #ad0 is assigned has a data value of the monitoring data signal being of 1 bit, and the data of the IDX address table have values in which #ad0 and #ad1 are consecutive. On the other hand, a station to which the address of #ad1 is assigned has a data value of the monitoring data signal being of 2 bits, and thus a pulse of #ad2 is also assigned to the same station as #ad1. Therefore, #ad3 is stored in the data of the IDX address table as the next value to #ad1. In the present embodiment, even in the case where the data value of the monitoring data signal is of 1 bit, #ad0 is also regarded as the head address in the same manner as #ad1.

Furthermore, when the first management monitoring-data STi and the second management monitoring-data IDXi are data having a value other than "0" in the comparison/determination unit B 27b, the main station 2 determines that there is no disconnection caused in the substation. On the other hand, when the first management monitoring-data STi and the second management monitoring-data IDXi have a value of "0", the main station 2 determines that there is disconnection caused in the substation.

The designation of the data in the IDX address table by the management control data IDXo complies with the table number. That is, index address data of the table number 1 (#ad0) is first selected and outputted as the management control data IDXo. Then, for each transmission cycle, it is sequentially changed to the head address data corresponding to each table number. However, there is no limit on the order of designating the data of the IDX address table by the management control data IDXo, and for example, the designation may comply with the order of priority set in function.

REFERENCE SIGNS LIST 1 control unit
2 main station
5 input/output substation (substation)
6 output substation (substation)
7 input substation (substation)
8 controlled part
9 input unit
11 output unit
12 inputting unit
13 control data
14 management control data
15 substation response data
16 monitoring data
17 management determination unit
21 output data part
22 management data part
23 timing generation unit
24 main-station output unit
25 main-station input unit
26 input data part
27a comparison/determination unit A
27b comparison/determination unit B
29 storage unit
31 OSC (oscillation circuit)
32 timing generation unit
33 control-data generation unit
34 line driver
35 monitoring-signal detection unit
36 monitoring-data extraction unit
37 input data
38 IDXi data
39 STi data
40 substation input/output unit
41 transmission reception unit
42 management-control-data extraction unit
43 address extraction unit
44 address setting unit
45 control-data extraction unit
46 management-monitoring-data transmission unit
47 monitoring-data transmission unit
48 output unit
49 input part
50 random-number generation unit
51 address-overlap display unit
60 substation output unit
70 substation input unit
TR transistor

The invention claimed is:

1. A transmission line address overlap detection system in a control/monitoring-signal transmission system, the transmission line address overlap detection system comprising:
a single main station; and
a plurality of substations connected to each other and the single main station via a common data signal line,
wherein, under control of a transmission clock generated by a timing generation unit included in the main station,
the main station outputs a series of pulsed signals, including a control data signal generated based on a value of control data sent from a control unit, to the common data signal line, extracts a data value of a monitoring data signal, superimposed on the series of pulsed signals for each cycle of the clock from each of the substations, and sends the extracted data value to the control unit, and
each of the substations counts pulses of the series of pulsed signals starting from a start signal indicating start of the series of pulsed signals, extracts the control data corresponding to its own substation from the series of pulsed signals when the count value matches address information of the substation counting the pulses, and superimposes the monitoring data signal on the series of pulsed signals in the same pulse cycle as a clock in which the control data corresponding to the substation counting the pulses is extracted, wherein:
the series of pulsed signals comprises a control/monitoring data area and a management data area,
the control/monitoring data area includes data of the control data signal and data of the monitoring data signal,
the management data area includes a plurality of pulsed signals, the management data area being different from the control/monitoring data area;
the substation sets random number data generated by its own substation as an original number, generates a plurality of pieces of comparison/collation data including data of a plurality of bits based on the original number, and superimposes a signal including the pieces of comparison/collation data on the management data area; and
the main station determines existence or non-existence of address overlap in the substations based on a result of comparing the pieces of comparison/collation data in compliance with a predetermined rule,
wherein the comparison/collation data comprises two types of data including the original number and one other number based on the original number and wherein one of the pieces of the comparison/collation data comprises the original number and another one of the pieces of the comparison/collation data comprises said one other number.

2. The transmission line address overlap detection system according to claim 1, wherein
when overlap of the address of the substation is detected, the main station creates an overlap address table in which the overlap address is stored, and
while the overlap address is stored in the overlap address table, the main station determines that there is an abnormal state and performs an address adjustment to resolve the overlap of the address, and when no overlap address is stored in the overlap address table, the main station determines that there is a normal state.

3. The transmission line address overlap detection system according to claim 1, wherein
the management data area includes a management control data area on which data from the main station are superimposed and a management monitoring data area on which data from the substation including the pieces of the comparison/collation data are superimposed,
the data to be superimposed on the management monitoring data area from the substation are set to data having a value other than "0", and
when data extracted from the management monitoring data area in the main station has a value of "0", it is determined that there is disconnection of the common data signal line.

4. The transmission line address overlap detection system according to claim 1, wherein the main station counts a head address and a non-head address of a substation, and specifies another count value of the head address and the non-head address as an address width data of the substation.

5. The transmission line address overlap detection system according to claim 1, wherein the substation displays a notification that overlap of an address occurs when the overlap of the address occurs.

6. A substation terminal connected to a common data signal line to which a main station is connected, the substation terminal comprising:
an address extraction unit that counts pulses of a series of pulsed signals transmitted over the common data signal line starting from a start signal indicating start of the series of pulsed signals, and obtains a control data signal, included in the series of pulsed signals, at a timing when the count value matches address information of the substation terminal;
a monitoring-data transmission unit that superimposes a monitoring data signal as first information from the substation terminal on the series of pulsed signals at a timing when the control data signal is received from the address extraction unit, wherein the series of pulsed signals comprises a control/monitoring data area and a management data area, and the control/monitoring data area includes data of the control data signal and data of the monitoring data signal;
a management-control-data extraction unit that extracts management control data superimposed by the main station on the management data area including a plurality of pulsed signals;
a management-monitoring-data transmission unit that superimposes a management monitoring data signal as second information from the substation terminal in an input data period having the same cycle corresponding to an output data period for which a signal constituting the management control data is superimposed; and
a comparison/collation-data output unit that obtains address data from the management-control-data extraction unit, and when the address data matches an address of the substation terminal, sets random number data generated by the substation terminal as an original number, generates a plurality of pieces of comparison/collation data including data having a plurality of bits based on the original number, and sends the pieces of comparison/collation data to the management-monitoring-data transmission unit,
wherein the comparison/collation data comprises two types of data including the original number and one other number based on the original number and wherein one of the pieces of the comparison/collation data comprises the original number and another one of the pieces of the comparison/collation data comprises said one other number.

7. The substation terminal according to claim 6, further comprising an overlap-address display unit that displays, when a control unit connected to the main station informs the substation terminal of overlap of an address of the substation terminal, an occurrence of the overlap of the address.

* * * * *